United States Patent
Kraus et al.

(10) Patent No.: US 9,989,039 B2
(45) Date of Patent: Jun. 5, 2018

(54) SINGLE-ACTUATION VALVE ARRANGEMENT FOR AEROSPACE COMPONENT, AND AEROSPACE COMPONENT

(71) Applicant: Airbus DS GmbH, Taufkirchen (DE)

(72) Inventors: Stephan Kraus, Oedheim (DE); Thomas Maier, Lauffen (DE); Markus Wolf, Mannheim (DE); Georg Schulte, Neuenstadt (DE)

(73) Assignee: Airbus DS GmbH, Taufkirchen (DE)

( * ) Notice: Subject to any disclaimer, the term of this patent is extended or adjusted under 35 U.S.C. 154(b) by 49 days.

(21) Appl. No.: 14/638,402

(22) Filed: Mar. 4, 2015

(65) Prior Publication Data

US 2015/0252794 A1 Sep. 10, 2015

(30) Foreign Application Priority Data

Mar. 6, 2014 (DE) .................. 10 2014 002 972

(51) Int. Cl.
*F03G 7/06* (2006.01)
*F16K 1/34* (2006.01)
*F16K 31/02* (2006.01)

(52) U.S. Cl.
CPC .............. *F03G 7/065* (2013.01); *F16K 1/34* (2013.01); *F16K 31/025* (2013.01)

(58) Field of Classification Search
CPC .......... F16K 1/34; F16K 31/025; F03G 7/065
USPC ............. 251/11, 66, 319, 68; 137/72, 76, 75
See application file for complete search history.

(56) References Cited

U.S. PATENT DOCUMENTS

| 256,109 | A | * | 4/1882 | Locke ................... F16K 25/04 251/210 |
| 3,974,844 | A | * | 8/1976 | Pimentel ................ F03G 7/065 137/1 |
| 4,973,024 | A | | 11/1990 | Homma |
| 6,575,188 | B2 | * | 6/2003 | Parunak ............ B01L 3/502738 137/251.1 |
| 9,038,983 | B2 | | 5/2015 | Kollar et al. |

(Continued)

FOREIGN PATENT DOCUMENTS

| DE | 10 2011 054 458 A1 | 5/2012 |
| DE | 20 2012 104 460 U1 | 2/2014 |

(Continued)

OTHER PUBLICATIONS

European Search Report issued in counterpart European Application No. 15000586.6 dated Jul. 27, 2015 with Statement of Relevancy (Nine (9) pages).

*Primary Examiner* — Umashankar Venkatesan
(74) *Attorney, Agent, or Firm* — Crowell & Moring LLP

(57) ABSTRACT

A valve arrangement for an aerospace component includes an inlet, an outlet, and an actuator that can be actuated by a heating element. In a non-actuated state of the actuator, the valve is open to allow flow between the inlet and the outlet. The actuator is a single-use effect shape memory actuator that is compressed in the martensitic state along a longitudinal axis of the actuator and integrated into the valve arrangement. Through the activation of the heating element upon reaching a predetermined transformation temperature, the actuator undergoes a change in length, whereby it is gradually pressed against a seal seat that is embodied at the inlet or the outlet.

17 Claims, 1 Drawing Sheet

(56) References Cited

U.S. PATENT DOCUMENTS

Figure 1:
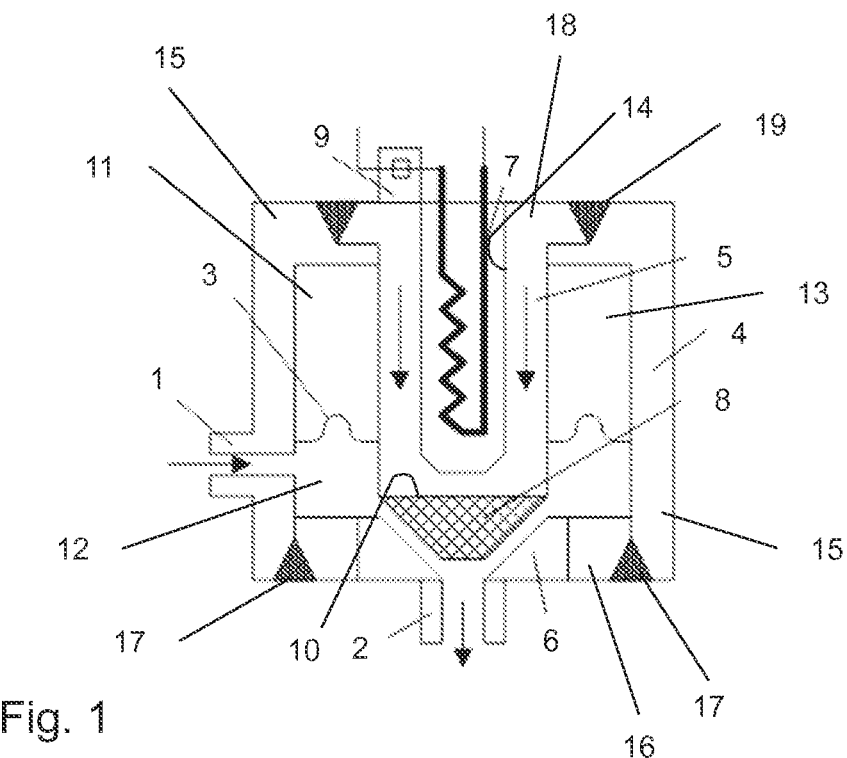

| | | | |
|---|---|---|---|
| 2005/0173661 A1* | 8/2005 | Mignon | F16K 31/002 251/11 |
| 2011/0234362 A1* | 9/2011 | Koehler | F03G 7/065 337/290 |
| 2013/0167377 A1 | 7/2013 | Gillespie | |
| 2013/0340843 A1* | 12/2013 | Gilmer | F16K 17/406 137/68.11 |
| 2015/0316164 A1* | 11/2015 | Sohn | F16K 31/025 251/318 |

FOREIGN PATENT DOCUMENTS

| | | |
|---|---|---|
| JP | 2-125188 A | 5/1990 |
| JP | 2009-92130 A | 4/2009 |

* cited by examiner

SINGLE-ACTUATION VALVE ARRANGEMENT FOR AEROSPACE COMPONENT, AND AEROSPACE COMPONENT

CROSS-REFERENCE TO RELATED APPLICATIONS

The present application claims priority under 35 U.S.C. § 119 to German patent application 10 2014 002 972.7, filed Mar. 6, 2014, the entire disclosure of which is herein expressly incorporated by reference.

BACKGROUND AND SUMMARY OF THE INVENTION

Exemplary embodiments of the invention relate to a single-actuation valve arrangement, particularly for an aerospace component. It comprises an inlet and an outlet as well as an actuator that can be actuated by a heating element. In a non-actuated state of the actuator, flow throughput is enabled between the inlet and the outlet. The valve arrangement thus constitutes a so-called normally-open (NO) configuration. The invention further relates to an aerospace component.

Valves are generally used, for example, in places in which a pipe for liquid or gaseous media needs to be opened or closed. Depending on the application, the valves can be provided for multiple or also only one-time actuation, the latter being the case in drive systems for aerospace applications, for example.

Valves for orbital drive systems are often actuated by pyrotechnical means. While the service life of satellites is becoming longer and longer and can already be more than 15 years, the service life of a pyrotechnical actuator is limited to a few years. If a pyrotechnical valve is actuated at the beginning of a mission, this poses no problem. However, if a valve is to be actuated toward the end of the planned service life of a satellite, for example in order to discharge containers, then the actuation of the valve must be achieved in another way, since the function of the pyrotechnical components cannot be safely ensured.

Another drawback, particularly of pyrotechnical actuators, is that single-use valves are often actuated very quickly, and hydraulic and/or structural shock loads can result.

In general, high demands are placed on the reliability of the control of valves in aerospace applications, since a malfunction could lead to substantial damage to or even the loss of the drive system.

Exemplary embodiments of the present invention are directed to a structurally and/or functionally reliable valve arrangement for closing a valve as well as a corresponding aerospace component for aerospace applications.

Exemplary embodiments of the present invention provide a valve arrangement, particularly for an aerospace component, for one-time actuation, which comprises an inlet and an outlet as well as an actuator that can be actuated by a heating element. In a non-actuated state of the actuator, flow throughput is enabled between the inlet and the outlet. This corresponds to a so-called normally-open (NO) configuration. The actuator is a single-use effect shape memory actuator that is compressed in the martensitic state along a longitudinal axis of the actuator and is integrated into the valve arrangement. Through the activation of the heating element upon reaching a predetermined transformation temperature, the single-use effect shape memory actuator undergoes a change in length, whereby it is gradually pressed against a seal seat that is embodied at the inlet or the outlet.

The invention provides a valve arrangement that can be used independently of the service life of an aerospace component, even toward the end of it. A high level of reliability is ensured by the principle employed. To close the valve that is open before actuation, the valve is electrically heated. Upon reaching the transformation temperature, the actuator expands until the original length before compression is reached. Such great forces are thus released that a high-level sealing effect is achieved through the pressing of the single-use effect shape memory actuator against the seal seat. Upon cooling of the actuator, its length and force on the seal then remain intact, whereby the valve remains permanently closed.

The principle underlying the valve arrangement is not subject to any limitation in terms of service life. This results particularly from the fact that the valve arrangement does not use stored chemical energy of any kind. Another advantage is that the valve arrangement can be actuated slowly. As a result, hydraulic shock loads (so-called "water hammer") can be avoided. Likewise, as a result, no structural shock loads occur as a result of the triggering of explosive charges like in a pyrotechnical valve.

According to an advantageous embodiment, the transformation temperature of the material of the actuator lies between 80° C. and 100° C. In general, the transformation temperature depends on the material of the single-use effect shape memory actuator. For example, a nickel-titanium alloy can be used which is also known by the name of Nitinol.

According to another exemplary embodiment, a sealing piston is arranged on a front side of the actuator facing away from the seal seat. The sealing piston can be made of a ductile material. In consideration of the long-term compatibility of the media to be conveyed, PTFE, aluminum alloys or gold-plated austenitic chromium-nickel steel can be used, for example. Furthermore, it is advantageous if the sealing piston is embodied in the shape of a truncated cone. The sealing effect can be positively influenced in the desired manner through the material and the structure of the sealing piston.

Furthermore, it is advantageous if the seal seat has a truncated-cone shape corresponding to the shape of the sealing piston. The seal seat can be made of a material that is harder in comparison to the scaling piston. This ensures that, as the single-use effect shape memory actuator expands and the great pressures thus released upon pressing against the seal seat, a plastic deformation of the ductile occurs and the desired high-level sealing effect is achieved.

According to another exemplary embodiment, an interior space of the housing is subdivided by an elastic partition element into a working space and a free space. The inlet and the outlet advantageously lead into the working space, a first longitudinal segment of the actuator being arranged in the working space with respect to the quantity of the longitudinal actuator. A provision is also made that, with respect to the length of the longitudinal actuator, a second longitudinal segment is arranged in the free space that is larger or substantially larger than the first longitudinal segment. An optional separation of media can be achieved in this way. This is advantageous, for example, if the material of the shape memory actuator and the medium to be connected (e.g., a gas or a fluid) are not chemically compatible.

The partition element can be a metal bellows or a diaphragm. In principle, the material of the partition element is selected such that there is compatibility with the medium to be connected. A titanium or an FeNiCr alloy, for example, can be used as the material.

In another embodiment, the actuator has a recess extending in the direction of the longitudinal axis in whose interior the heating element is arranged. The recess can be embodied, for example, as a bore and pass substantially nearly completely through the actuator.

In order to ensure the switching-off of the heating element, it is advantageous for the heating element to be secured by means of a thermal fuse. When the transformation temperature is exceeded, the thermal fuse can be tripped, thus separating the power circuit from the heating element. Overheating of the medium to be connected can be prevented in this way.

According to another embodiment, the longitudinal axis of the actuator matches with a longitudinal axis of the inlet or of the outlet. For example, the inlet and the outlet can be arranged on different sides of a housing of the valve arrangement. For example, the a be arranged on the bottom of the housing, while the inlet is provided on one of the side walls of the housing of the valve arrangement. This enables not only a simple construction, but also the abovementioned separation of media with the aid of the partition element. It is advantageous in this context if the inlet is then arranged in the vicinity of the bottom so that the shape memory actuator has as little co act as possible with the medium to be connected, i.e., the first longitudinal segment can be kept as short as possible.

Furthermore, an aerospace component for an aerospace application is provided, which has at least one valve arrangement of the type described above. The aerospace component, e.g., a satellite, a drive component or the like, has the same advantages as were described above in connection with the valve arrangement according to the invention.

BRIEF DESCRIPTION OF THE DRAWING FIGURES

The invention is explained below in further detail on the basis of an exemplary embodiment in the drawing.

Figure 2:
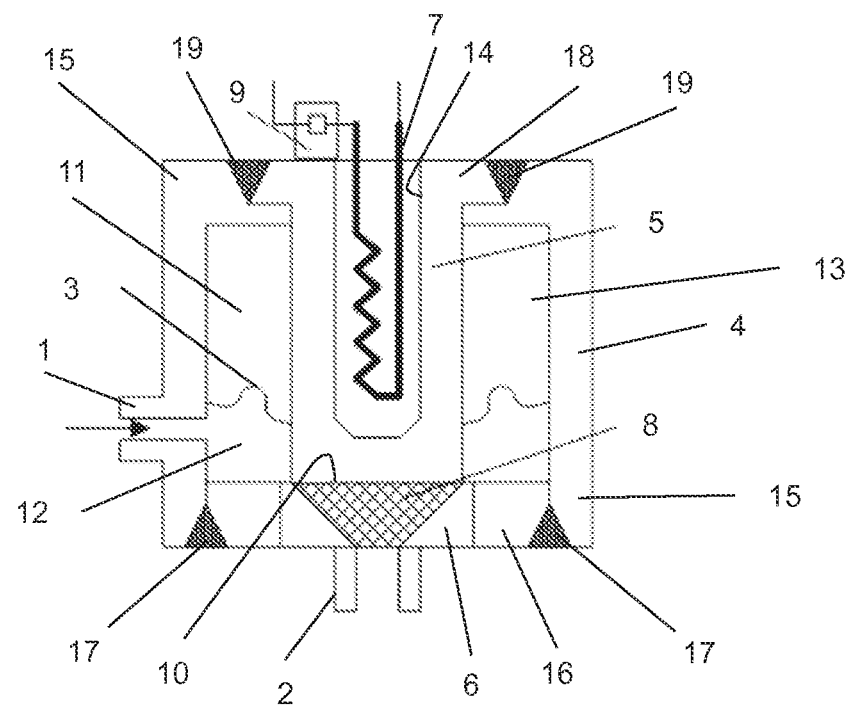

FIG. 1 shows a schematic cross-sectional representation of a valve arrangement according to the invention before activation, and FIG. 2 shows a schematic cross-sectional representation of a valve arrangement according to the invention from FIG. 1 after activation thereof.

DETAILED DESCRIPTION

FIG. 1 shows a schematic cross-sectional representation of a valve arrangement according to the invention. The valve arrangement is provided for one-time actuation and is open in a non-actuated state, which is shown in FIG. 1. The valve arrangement thus constitutes a so-called normally-open (NO) valve arrangement.

The valve arrangement comprises a housing 4. The housing 4 is embodied in multiple parts merely for the sake of example and consists of side walls 15 and a bottom 16. The housing part comprising the side walls 15 can be embodied in a single piece, i.e., it can be cylindrical. The bottom 16 and the side walls 15 are connected to each other in a fluid-tight manner by means of a circumferential welded seam or several welded seams 17. Protruding from the upper side into the housing interior 11 of the housing 4 is an actuator 5 embodied as a single-use effect shape memory actuator. The substantially longitudinal actuator 5 has a flange 18 with which it is supported on the upper side on the side walls 15 or rests thereupon. A fluid-tight connection is established between the flange 18 or the actuator 5 and the side walls 15 by means of welded seams 19.

For the sake of example, the housing 4 has an inlet 1 on the left side wall 15 and an outlet 6 on the bottom 16. A longitudinal axis of the outlet 2 (not shown) matches with a longitudinal axis of the actuator 5 (also not shown). On a front side 10 facing toward the outlet 2, the actuator 5 is provided with a sealing piston 8 made of ductile material. In consideration of the long-term compatibility with the media to be conveyed, PTFE, aluminum alloys or gold-plated austenitic chromium-nickel steel, for example, can be used as ductile material. The sealing piston 8 has a truncated cone shape, the truncated cone tapering in the direction of the outlet 2. The seal seat 6 embodied at the outlet 2 has an inverse truncated-cone shaped structure corresponding thereto, i.e., the outlet 2 expands in the direction of the housing interior. The seal seat 6 of the outlet 2 is made of a hard material. A titanium alloy/FeNiCr alloy, for example, can be used for this purpose.

The actuator 5 is provided on its interior with a longitudinal recess 14, e.g., a bore. An electrical heating element 7 is arranged in the recess 14 which extends nearly over the entire length of the actuator 5. The heating element 7 is connected via an optional thermal fuse 9 to a power or energy source (not shown).

The interior space 11 of the housing is subdivided by an elastic partition element 3, for example a metal bellows or a diaphragm, into a working space 12 and a free space 13. The inlet 1 and the outlet 2 come to rest in the housing 4 such that they lead into the working space 12.

With respect to the length of the longitudinal actuator 5, a first, short longitudinal segment of the actuator is arranged in the working space 12. In contrast, a second longitudinal segment that is larger or substantially larger than the first, short longitudinal segment is arranged in the free space 13. As will readily be understood, the free space 13 remains free of the medium to be connected, e.g., a gas or a fluid. The provision of the elastic partition element is advantageous if the material of the actuator 5 is not compatible with the medium to be connected. Optionally, the partition element 3 can border the actuator 5 such that only the sealing piston 8 lies in the working space 12.

The actuator 5 is a single-use effect shape memory actuator with martensitic and austenitic transformation characteristics. The actuator 5 is compressed in the martensitic state and integrated into the valve arrangement in the manner shown in FIG. 1. Depending on the material selected for the actuator 5, such as NiTi, a nickel-titanium alloy, for example, the transformation temperature lies in a range between 80° C. and 100° C. In this temperature range, overheating of the medium to be connected is reliably prevented.

To close the valve, the heating element 7 is activated through the application of current. Once the transformation temperature, which depends on the material or the material composition of the actuator, is reached, the actuator 5 expands until the original length before compression is reached. Great forces are released during expansion which plastically deform the sealing piston 8, which is made of ductile material, upon meeting the hard seal seat 6. As a result, good contact of the sealing piston 8 against the seal seat 6 is achieved, thus resulting in a high-level sealing effect.

When the transformation temperature is exceeded, the optionally provided thermal fuse 9 is tripped, thus separating the power circuit from the heating element 7. As a result, overheating of the medium to be connected, which can now no longer flow out of the working space 12 on the interior of the valve arrangement, is prevented.

Upon cooling of the actuator 5, its length and force against the seal seat 6 remain intact. As a result, the valve 2 remains permanently closed.

FIG. 2 shows the state of the valve arrangement after actuation, with the sealing piston 8 resting in a plastically deformed manner against the seal seat 6. It can also be clearly seen that, as a result of the change in length of the actuator 5, the partition element 3 follows the longitudinal movement of the actuator 5 in the direction of the outlet 2 and slightly reduces the size of the working space.

The advantage of the existing valve arrangement is that there is no limitation to the service life, since no stored chemical energy need be used for the actuation.

The actuation of the valve occurs slowly according to the change in length of the actuator when the transformation temperature is reached. As a result, hydraulic shock loads can be avoided. Likewise, no structural shock loads occur such as those which occur when explosive charges are triggered in a pyrotechnical valve, for example.

The construction of the valve arrangement is simple, so that it can also be provided in a cost-effective manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

1 inlet
2 outlet
3 partition element
4 housing
5 single-use effect shape memory actuator
6 seal seat
7 healing element
8 sealing piston
9 thermal fuse
10 front side
11 interior space
12 working space
13 free space
14 recess
15 side wall
16 bottom
17 positive connection, e.g., welded seam
18 flange
19 positive connection, e.g., welded seam

What is claimed is:

1. A one-time actuated valve arrangement, comprising:
an inlet;
an outlet;
an actuator actuatable by a heating element, wherein the actuator is a cylindrical housing surrounding the heating element,
wherein, in a non-actuated state of the actuator, the valve is open to allow a flow between the inlet and the outlet,
wherein the actuator is a single-use effect shape memory actuator compressed in the martensitic state along a longitudinal axis of the actuator and integrated into the valve arrangement, and which undergoes a change in length as a result of an activation of the heating element when a predetermined transformation temperature is reached so that it is gradually pressed against a seal seat arranged at the inlet or the outlet,
wherein a sealing piston is arranged on a front side of the actuator facing toward the seal seat, and
wherein the actuator has a recess extending in the direction of the longitudinal axis and the heating element is arranged in the recess within an interior of the actuator.

2. The valve arrangement of claim 1, wherein the transformation temperature of the material of the actuator is between 80° C. and 100° C.

3. The valve arrangement of claim 1, wherein the sealing piston has a truncated cone shape.

4. The valve arrangement of claim 1, wherein the seal seat has a truncated-cone shape corresponding to a shape of the sealing piston.

5. The valve arrangement of claim 1, wherein an interior space of the housing is subdivided by an elastic partition element into a working space and a free space.

6. The valve arrangement of claim 5, wherein the inlet and the outlet lead into the working space, a first longitudinal segment of the actuator is arranged in the working space with respect to a length of the longitudinal actuator.

7. The valve arrangement of claim 6, wherein, with respect to the length of the longitudinal actuator, a second longitudinal segment is arranged in the free space that is larger than the first longitudinal segment.

8. The valve arrangement of claim 5, wherein the elastic partition element is a metal bellows or a diaphragm.

9. The valve arrangement of claim 1, wherein the heating element is secured by a thermal fuse.

10. The valve arrangement of claim 1, wherein the longitudinal axis of the actuator aligns with a longitudinal axis of the inlet or of the outlet.

11. An aerospace component for an aerospace application, comprising:
at least one actuated valve arrangement, comprising
an inlet;
an outlet;
an actuator actuatable by a heating element, wherein the actuator is a cylindrical housing surrounding the heating element,
wherein, in a non-actuated state of the actuator, the valve is open to allow a flow between the inlet and the outlet,
wherein the actuator is a single-use effect shape memory actuator compressed in the martensitic state along a longitudinal axis of the actuator and integrated into the valve arrangement, and which undergoes a change in length as a result of an activation of the heating element when a predetermined transformation temperature is reached, wherein, as a result of the change in length, the actuator so that it is gradually pressed against a seal seat arranged at the inlet or the outlet,
wherein a sealing piston is arranged on a front side of the actuator facing toward the seal seat, and
wherein the actuator has a recess extending in the direction of the longitudinal axis and the heating element is arranged in the recess within an interior of the actuator.

12. The valve arrangement of claim 1, wherein the sealing piston is made of a ductile material.

13. The valve arrangement of claim 1, wherein the seal seat is made of a harder material compared to a material of the sealing piston.

14. The valve arrangement of claim 1, wherein, upon being pressed against the seal seat, the sealing piston is plastically deformed.

15. The valve arrangement of claim 5, wherein the partition element borders the actuator such that only the sealing piston lies in the working space.

16. The aerospace component of claim 11, wherein the seal seat is made of a harder material compared to a material of the sealing piston.

17. The aerospace component of claim 11, wherein, upon being pressed against the seal seat, the sealing piston is plastically deformed.

\* \* \* \* \*